United States Patent
Kerth et al.

(10) Patent No.: US 7,583,946 B2
(45) Date of Patent: Sep. 1, 2009

(54) WIRELESS COMMUNICATION SYSTEM AND METHOD USING CLOCK SWAPPING DURING IMAGE REJECTION CALIBRATION

(75) Inventors: Donald A. Kerth, Austin, TX (US); Srihari Adireddy, Austin, TX (US); Brian Douglas Green, Austin, TX (US); Tod Paulus, New York, NY (US); Scott D. Willingham, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 445 days.

(21) Appl. No.: 11/340,941

(22) Filed: Jan. 27, 2006

(65) Prior Publication Data

US 2006/0128338 A1 Jun. 15, 2006

Related U.S. Application Data

(63) Continuation-in-part of application No. 11/263,450, filed on Oct. 31, 2005, now abandoned, and a continuation-in-part of application No. 10/673,905, filed on Sep. 29, 2003, now Pat. No. 7,362,826.

(60) Provisional application No. 60/717,346, filed on Sep. 15, 2005.

(51) Int. Cl.
H04B 1/06 (2006.01)
(52) U.S. Cl. .............. 455/260; 455/296; 455/333; 375/327; 331/19
(58) Field of Classification Search ......... 455/255–260, 455/285, 296, 302, 323, 333; 375/316, 324, 375/327, 345, 346; 331/16, 18, 19
See application file for complete search history.

(56) References Cited

U.S. PATENT DOCUMENTS 4,695,943 A 9/1987 Keeley
4,831,623 A 5/1989 Terzian (Continued)

OTHER PUBLICATIONS

Wolfson, "Internet Audio DAC with Integrated Headphone Driver", Wolfson Microelectronics, Production Data, Rev. 4.0, Nov. 2004.

(Continued)

Primary Examiner—Nhan T Le
(74) Attorney, Agent, or Firm—Mark P Kahler

(57) ABSTRACT

A wireless communication receiver is disclosed that operates in a test mode to determine image correction information that is used to suppress undesired image signals when the receiver switches to a normal operational mode. In one embodiment, the receiver includes a frequency synthesizer coupled by a quadrature divider to an in-phase (I) mixer and a quadrature mixer. The mixers are coupled by respective analog to digital converters (ADCs) to respective I and Q channel inputs of a digital signal processor (DSP). In the test mode, a test tone is provided to the mixer inputs. The test tone is divided down further and provided to clock the frequency synthesizer, the ADCs and the DSP. This configuration locks together the mixers, frequency synthesizer, ADCs and DSP ratiometrically in frequency during the test mode while image correction information is being determined. When the receiver switches to a normal operating mode, the frequency synthesizer, ADCs and DSP are clocked by a main clock signal instead of the divided down test tone, and the test tone is removed from the mixers.

27 Claims, 2 Drawing Sheets

U.S. PATENT DOCUMENTS

| | | | |
|---|---|---|---|
| 5,349,350 A | 9/1994 | Blagaila | |
| 6,477,148 B1 * | 11/2002 | Gardenfors et al. | 370/280 |
| 6,597,748 B1 | 7/2003 | Hietala et al. | |
| 6,819,150 B1 | 11/2004 | Santosa et al. | |
| 7,236,552 B2 * | 6/2007 | Robertson et al. | 375/354 |
| 2002/0023239 A1 * | 2/2002 | Nomura et al. | 713/500 |
| 2002/0075945 A1 * | 6/2002 | Farine et al. | 375/148 |
| 2003/0031082 A1 * | 2/2003 | Sawada | 365/233 |
| 2004/0130954 A1 | 7/2004 | Ogawa et al. | |
| 2004/0165153 A1 | 8/2004 | Maximus | |

OTHER PUBLICATIONS

Stauth et al., "Jitter Optimization Using Body Bias in Digital CMOS Ring Oscillators", U.C. Berkeley, Mar. 19, 2003.

Silver, "Ring Oscillator Primer", downloaded from www.odyseus.nildram.co.ok on Sep. 6, 2005.

Zamora, et al., "Low Phase Noise CMOS Ring Oscillator VCOs for Frequency Synthesis", Stanford University, Jul. 27, 1998.

* cited by examiner

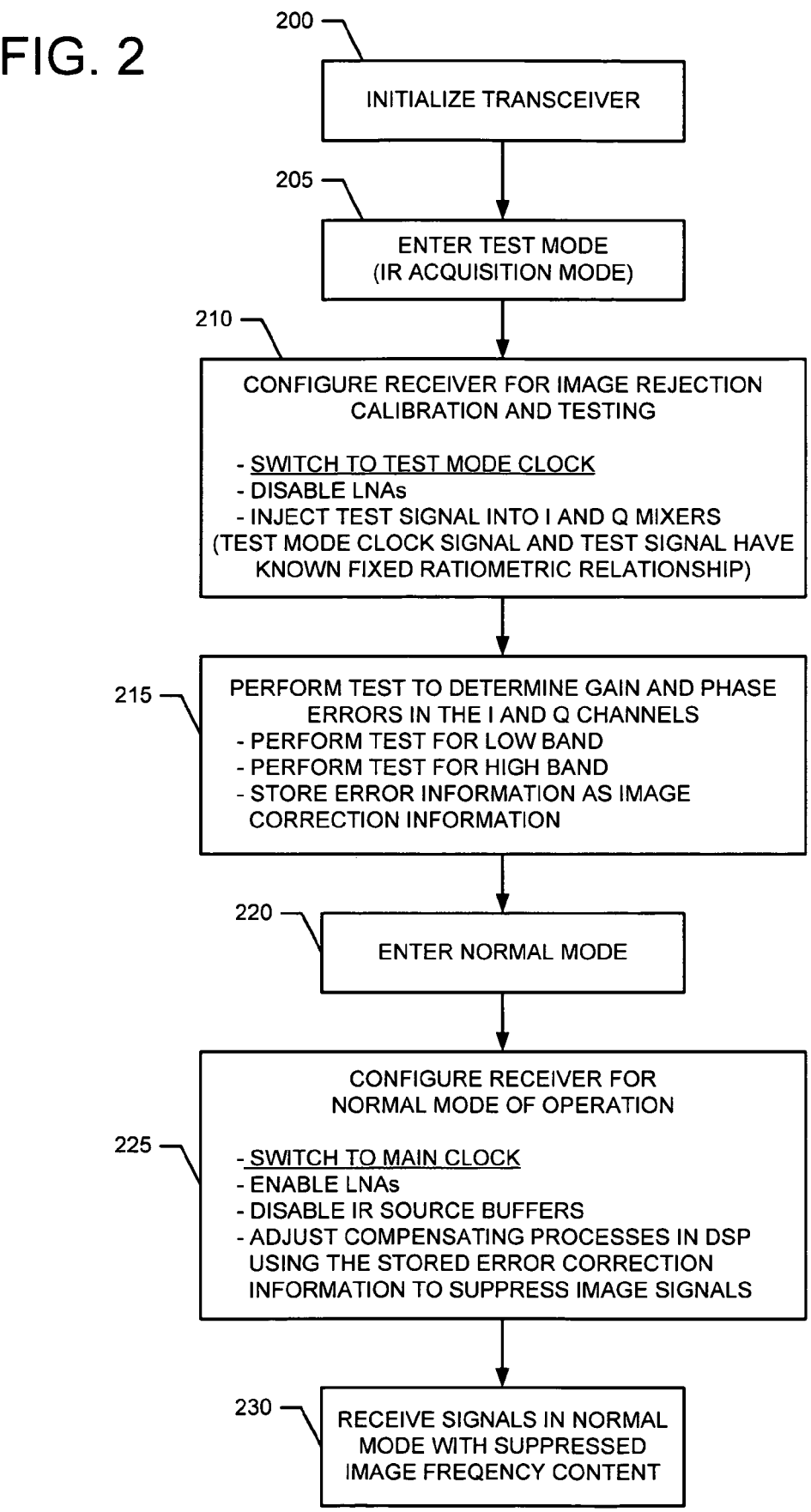

WIRELESS COMMUNICATION SYSTEM AND METHOD USING CLOCK SWAPPING DURING IMAGE REJECTION CALIBRATION

RELATED PATENT APPLICATIONS

This patent application is a continuation-in-part of, and claims priority to, the U.S. patent application entitled "WIRELESS COMMUNICATION SYSTEM AND METHOD USING CLOCK SWAPPING DURING IMAGE REJECTION CALIBRATION" by inventors Kerth, et al., Ser. No. 11/263,450, filed Oct. 31, 2005 now abandoned, which claims the benefit of Provisional U.S. patent application Ser. No. 60/717,346, filed Sep. 15, 2005, that is assigned to the same Assignee as the subject patent application, both of which are incorporated herein by reference in their entirety.

This patent application is a continuation-in-part of, and claims priority to, the U.S. patent application entitled "RECEIVER INCLUDING AN OSCILLATION CIRCUIT FOR GENERATING AN IMAGE REJECTION CALIBRATION TONE" by inventor Scott Willingham, Ser. No. 10/673,905 filed Sep. 29, 2003 now U.S. Pat. No. 7,362,826, that is assigned to the same Assignee as the subject patent application, and which is incorporated herein by reference in its entirety.

This patent application further claims priority to the U.S. patent application entitled "APPARATUS AND METHOD FOR DIGITAL IMAGE CORRECTION IN A RECEIVER", by inventor Tod Paulus, Ser. No. 10/675,601, filed Sep. 29, 2003, that is assigned to the same Assignee as the subject patent application, and which is incorporated herein by reference in its entirety.

This patent application further claims priority to the U.S. patent application entitled "APPARATUS AND METHOD FOR CALIBRATING IMAGE REJECTION IN RADIO FREQUENCY CIRCUITRY" by inventors Donald A. Kerth and G. Diwakar Vishakhadatta, Ser. No. 10/452,192 filed Jun. 2, 2003, which claims the benefit of U.S. Provisional Application No. 60/384,644, filed May 31, 2002 that is assigned to the same Assignee as the subject patent application, both of which are incorporated herein by reference in their entirety.

TECHNICAL FIELD OF THE INVENTION

The disclosures herein relate generally to wireless communication receivers, and more particularly, to communication receivers that employ image rejection technology.

BACKGROUND

Modern wireless communication devices typically employ a frequency synthesizer using phase locked loop technology to control the receive frequency of the device. A voltage controlled oscillator (VCO) provides a synthesizer output signal which is locked in frequency and phase to some multiple of a reference frequency provided by a reference oscillator. The synthesizer output signal is applied to a quadrature divider that processes the signal into an in-phase signal and a quadrature signal, the quadrature signal being 90 degrees out of phase with respect to the in-phase signal.

The in-phase signal is applied as a local oscillator signal, $I_{LO}$, to a mixer in the in-phase or I channel of the communication device. The quadrature signal is applied as a local oscillator signal, $Q_{LO}$, to another mixer in the quadrature or Q channel of the communication device. These mixers may be called the I channel mixer and the Q channel mixer, respectively. The receive signal from an antenna is supplied to both the I channel and Q channel mixers. Thus, the I channel and Q channel mixers mix the receive signal with a local oscillator signal down to some intermediate frequency (IF). Other circuits couple to the I and Q channels to further process IF signals into baseband signals. Finally, the baseband signals are processed to provide an audio signal, data signal or other output signal that is supplied to an output of the communication device.

Unfortunately, image signals can be an undesired byproduct of the mixing process. When a mixer mixes a receive signal with a local oscillator signal, it is possible that two signals can be received, namely the desired signal and an image signal. These two signals lie in a frequency band separated by a frequency which is twice the intermediate frequency (IF) of the receiver. The receiver designer seeks to allow the desired or wanted signal to pass through the receiver unimpaired while completely rejecting the image signal. In one example wherein the local oscillator signal is at 1 GHz and the desired receive signal is at 1.1 GHz, it is possible that the receiver might receive not only the desired 1.1 GHz signal, but also a 0.9 GHz signal, namely the image signal. Image rejection can be a challenging problem in communication device design.

What is needed is a wireless communication method and device that provides improved image rejection.

SUMMARY

Accordingly, in one embodiment, a method is disclosed for suppressing an image signal in a radio frequency receiver. The method includes supplying, while in a test mode, a test signal to a mixer in the receiver and a first clock signal to receiver stages coupled to the mixer. In one embodiment, one of the receiver stages is a digital signal processor. The first clock signal is a divided down version of the test signal. The method also includes determining, by the digital signal processor while in, the test mode; image correction information relating to errors caused by the receiver stages. The method also includes switching, by the receiver, to a normal mode, and while in the normal mode supplying a second clock signal to the receiver stages and a receive signal to the mixer instead of the test signal. The receive signal is mixed by the mixer to provide a mixed receive signal. The method still further includes correcting, by the digital signal processor while in the normal mode, the mixed receive signal with the image correction information to suppress image signals therein.

In another embodiment, a radio frequency receiver is disclosed that includes a radio frequency (RF) input and a mixer coupled to the RF input. The receiver includes a plurality of receiver stages coupled to the mixer, one of the stages being a digital signal processor (DSP). The receiver also includes a test signal generator, coupled to the mixer, that supplies the mixer with a test signal exhibiting a predetermined frequency, when the receiver is in a test mode. The receiver also includes a divider, coupled to the test signal generator, that divides the test signal to provide a first clock signal exhibiting a first frequency to the receiver stages, when the receiver is in the test mode. The DSP determines image correction information relating to errors caused by the receiver stages while in the test mode. The receiver further includes a main reference clock, coupled to the receiver stages, that supplies the receiver stages with a second clock signal exhibiting a second frequency when the receiver is in a normal mode. A receive signal is supplied to the mixer instead of the test signal thus generating a mixed receive signal. The DSP corrects the mixed receive signal with the image correction information to suppress image signals therein when the receiver is in the normal mode.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 2 is a flow chart depicting the methodology practiced in one embodiment of the communication receiver of FIG. 1.

DETAILED DESCRIPTION

Figure 1:
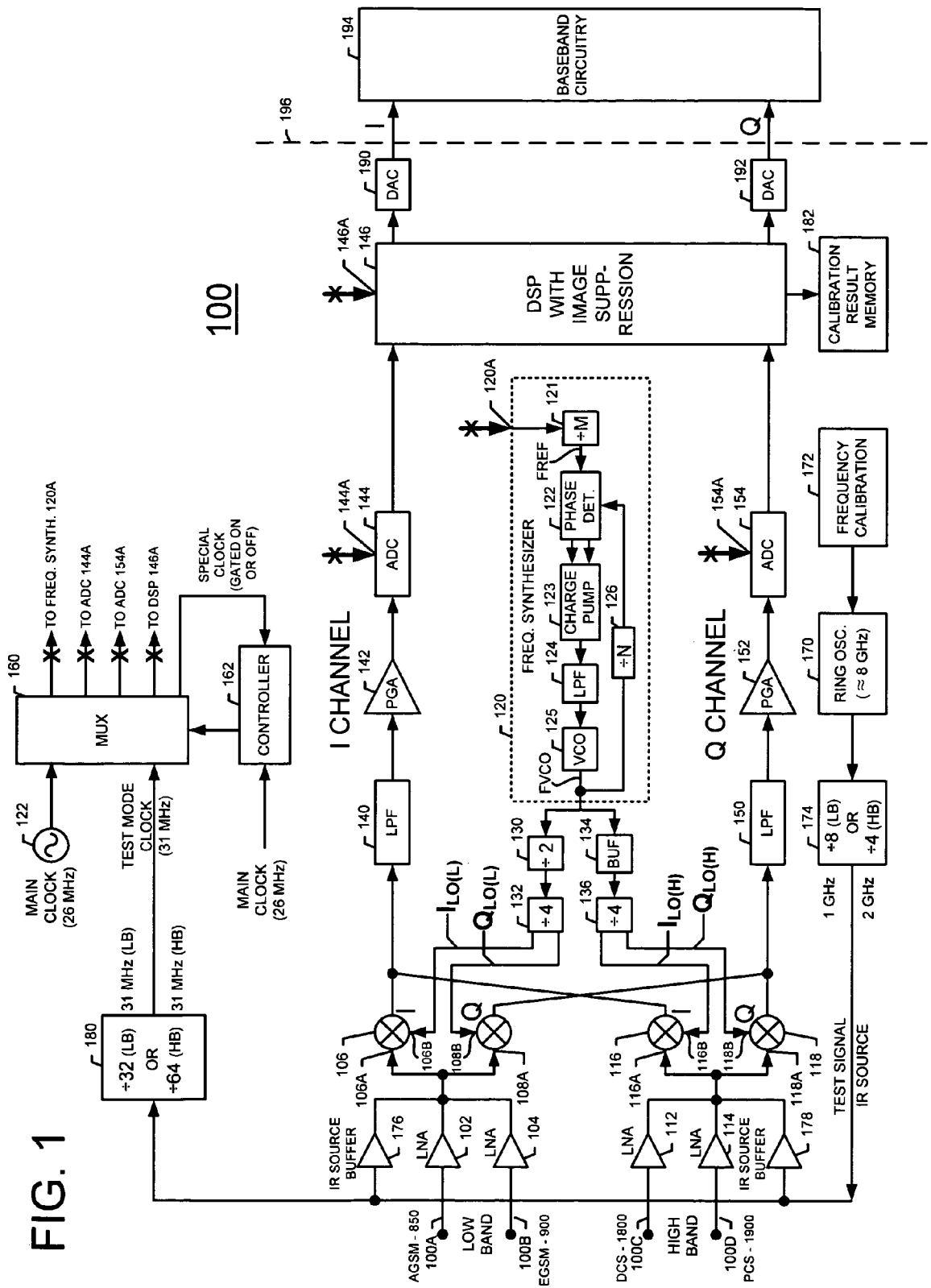
FIG. 1 is a block diagram of one embodiment of the disclosed communication receiver.

FIG. 1 is a block diagram of a communication receiver 100 that includes low band signal inputs 100A and 100B and high band signal inputs 100C and 100D. In this particular embodiment, receiver 100 is capable of quad band operation, namely low band AGSM operation at 850 MHz, low band EGSM operation at 900 MHz, high band DCS operation at 1800 MHz and high band PCS operation at 1900 MHz.

Low band signal inputs 100A and 100B couple respectively to low noise amplifiers (LNAs) 102 and 104, the outputs of which are coupled together and to the receive signal inputs 106A and 108A of I channel mixer 106 and Q channel mixer 108, respectively. High band signal inputs 100C and 100D couple respectively to low noise amplifiers (LNAs) 112 and 114, the outputs of which are coupled together and to the receive signal inputs 116A and 118A of I channel mixer 116 and Q channel mixer 118, respectively. LNAs 102, 104, 112 and 114 may also be referred to as input amplifiers.

A frequency synthesizer 120 generates an output signal which, after a division operation and a quadrature signal generation operation, becomes the I and Q local oscillator signals that are provided to mixers 106, 108, 116 and 118, as described in more detail below. Frequency synthesizer 120 includes a clock input 120A that receives either a MAIN CLOCK signal from main clock oscillator 122 when receiver 100 is operating in normal mode, or instead receives a special clock signal, namely a TEST MODE CLOCK signal, when the receiver is operating in test mode. In other words when in test mode, the MAIN CLOCK is swapped out in favor of the TEST MODE CLOCK. As explained in more detail below, when operating in test mode, receiver 100 determines image suppression information that enables the receiver to effectively suppress undesired image signals when the receiver switches back to the normal mode of operation.

Frequency synthesizer 120 includes a pre-divider 121 that divides the incoming clock signal at input 120A by an integer, M. In more detail, frequency synthesizer 120 includes pre-divider 121, a phase detector 122, a charge pump 123, a low pass filter 124, a voltage controlled oscillator (VCO) 125 and a divide by N divider circuit 126, all coupled together as shown in FIG. 1. VCO 125 generates a phase locked loop (PLL) output signal, FVCO, that exhibits a frequency N times the frequency of the reference signal, FREF, provided by pre-divider 121 to the input of phase detector 122.

To enable low band operation, an in-phase signal local oscillator (LO) signal, $I_{LO(L)}$, and a quadrature local oscillator signal, $Q_{LO(L)}$, are provided to I channel mixer input 106B and Q channel mixer input 108B, respectively. For low band operation, the FVCO output signal of synthesizer 120 is divided first by 2 at divider 130. The resultant signal is divided by 4 at a quadrature divider 132 to produce the in-phase local oscillator (LO) signal, $I_{LO(L)}$, and the quadrature local oscillator signal, $Q_{LO(L)}$.

However, for high band operation, an in-phase signal local oscillator (LO) signal, $I_{LO(H)}$, and a quadrature local oscillator signal, $Q_{LO(H)}$, are provided to I channel mixer input 116B and Q channel mixer input 118B, respectively. For high band operation, the FVCO output signal of synthesizer 120 is first buffered by buffer amplifier 134. The resultant signal is then divided by 4 at a quadrature divider 136 to produce the in-phase signal local oscillator (LO) signal, $I_{LO(H)}$, and the quadrature local oscillator signal, $Q_{LO(H)}$.

Depending on whether receiver 100 is operating in low band or high band mode, one of I channel mixers 106 and 116 mixes the receive signal from one of the input LNAs 102, 104, 112 and 114 with the in-phase local oscillator signal supplied to that mixer to produce a mixed receive signal, namely a down-converted I channel signal. This down-converted I channel signal is supplied via low pass filter (LPF) 140 and programmable gain amplifier (PGA) 142 to an analog to digital converter (ADC) 144. ADC 144 includes a clock input 144A. ADC 144 digitizes or samples the I channel signal and provides the resultant digitized I channel signal to DSP 146. This digitized I channel signal is also called a sampled mixed receive signal.

Similarly, depending on whether receiver 100 is operating in low band or high band mode, one of Q channel mixers 108 and 118 mixes the receive signal from one of the input LNAs with the quadrature local oscillator signal supplied to that mixer to produce a down-converted Q channel signal. This down-converted Q channel signal is supplied via low pass filter (LPF) 15Q and programmable gain amplifier (PGA) 152 to an analog to digital converter (ADC) 154. ADC 154 includes a clock input 154A. ADC 154 digitizes or samples the Q channel signal and provides the resultant digitized Q channel signal, namely a sampled mixed receive signal, to DSP 146. DSP 146 includes a clock input 146A. DSP 146 performs operations such as digital down conversion to baseband, channel filtering and digital gain adjustments. DSP 146 also performs image suppression operations as disclosed in the above-referenced copending patent applications entitled "APPARATUS AND METHOD FOR DIGITAL IMAGE CORRECTION IN A RECEIVER", by inventor Tod Paulus, Ser. No. 10/675,601, filed Sep. 29, 2003, and "RECEIVER INCLUDING AN OSCILLATION CIRCUIT FOR GENERATING AN IMAGE REJECTION CALIBRATION TONE" by inventor Scott Willingham, Ser. No. 10/673,905 filed Sep. 29, 2003. While operating in a special test mode, DSP 146 collects image rejection information which may also be called image suppression information or image correction information. Once DSP 146 collects the image rejection information, it uses the image rejection information to suppress images signals in the sampled I and Q channel signals provided thereto as described in the cited patent applications Ser. No. 10/675,601 and Ser. No. 10/673,905.

As mentioned above, communication receiver 100 operates in a normal mode to receive radio frequency signals while suppressing image signals and operates in a test mode to determine information needed to suppress such image signals. In an ideal communication receiver using in-phase and quadrature channels, the I and Q channels or paths in aggregate form a complex signal. The ability to reject undesired frequencies such as an image signal may depend on the accuracy of the transformation to such a complex signal and on maintaining that accuracy through the stages of the I and Q channels or paths. In actual practice, designing I and Q channel stages that behave ideally is difficult to achieve. For example, even the best I and Q channel stages may exhibit undesired time delays, phase shifts and gain imbalances. Ideally the mixers in the I and Q channels would exhibit perfectly matched delays and gain. However, again, in actual practice this is difficult to achieve. Moreover, ideally the remaining stages of the I channel should be matched in terms of delay and gain with corresponding stages in the Q channel. In actual practice, however, it is likely that some amount of phase or gain imbalance will exist between the I and Q mixers, and between corresponding stages of the I and Q channels, thus resulting in undesired image signals propagating to any circuitry downstream of the I and Q channels.

In the communication receiver 100 shown in FIG. 1, DSP 146 couples to the I and Q channels as shown. DSP 146 includes processing that, in one embodiment, introduces a variable gain and delay to signals received from the I and Q channels to compensate for the delay and gain variations that are introduced by non-ideal characteristics of quadrature dividers 132, 136, I mixer 106, Q mixer 108, I mixer 116, Q mixer 118, LPF 140, LPF 150, PGA 142, PGA 152, and ADCs 144, 154. The above incorporated Ser. No. 10/675,601 and Ser. No. 10/673,905 patent applications provide more information regarding the nature of the compensation that is applied to signals of the I and Q channels to achieve image correction and rejection.

When operating in normal mode, communication device 100 employs the above-referenced image rejection technique taught by patent applications Ser. No. 10/675,601 and Ser. No. 10/673,905 to suppress undesired image signals. However, before DSP 146 of communication device 100 can engage in such image suppression or rejection activities, DSP 146 determines or quantifies the phase and gain imbalances or errors exhibited by the I and Q channel as taught by patent applications Ser. No. 10/675,601 and Ser. No. 10/673,905. DSP 146 determines image correction information which it applies to an image correction network within DSP 146 to suppress image signals as taught by patent applications Ser. No. 10/675,601 and Ser. No. 10/673,905. When operating in normal mode, a MAIN CLOCK signal from main reference clock 122 is supplied to frequency synthesizer 120, ADC 144, ADC 154 and DSP 146 as shown. However, in one embodiment when receiver 100 operates in test mode, a special clock signal, for example an approximately 31 MHz TEST MODE CLOCK signal is instead supplied to frequency synthesizer 120, ADC 144, ADC 154 and DSP 146.

In more detail, receiver 100 includes a multiplexer (MUX) 160 that operates under the control of a controller 162 coupled thereto to provide either the MAIN CLOCK signal from oscillator 122, or a TEST MODE CLOCK signal, to synthesizer 120, ADC 144, ADC 154 and DSP 146. Controller 162 determines whether receiver 100 is in test mode or normal operational mode. When controller 162 operates receiver 100 in normal mode, controller 162 supplies the MAIN CLOCK signal to synthesizer 120, ADC 144, ADC 154 and DSP 146. However, when controller 162 operates receiver 100 in test mode, controller 162 supplies the TEST MODE CLOCK signal to synthesizer 120, ADC 144, ADC 154 and DSP 146. Moreover, when receiver 100 is in test mode, the TEST MODE CLOCK signal is generated from a divided version of a reference signal supplied by ring oscillator 170. A frequency calibrator 172 conducts a frequency calibration process to set ring oscillator 170 to a predetermined reference frequency such as 8 GHz in this particular example. A divider circuit 174 couples to ring oscillator 170 to divide the ring oscillator signal by 8 for low band operation or by 4 for high band operation. Divider 174 thus provides a 1 GHz test signal or test tone for low band operation or a 2 GHz test signal or test tone for high band operation. This test signal may also be referred to as an image reject (IR) source signal. The test signal or IR source signal is supplied to the receive inputs of mixers 106 and 108 to conduct an image reject (IR) test for low band, or to the receive inputs of mixers 116 and 118 to conduct an IR test for high band operation. When operating in this test mode, controller 162 turns off LNAs 102, 104, 112 and 114 via a connection (not shown) between the controller and LNAs. An image reject (IR) source buffer 176 supplies the test signal, namely the IR source signal, to mixers 106 and 108. An IR source buffer 178 supplies the test signal, namely the IR source signal, to mixers 116 and 118.

In one embodiment, after being provided to the mixers as described above, the test signal is divided by divider 180 to generate the TEST MODE CLOCK signal that is supplied by MUX 160 to synthesizer 120, ADC 144, ADC 154 and DSP 146 instead of the MAIN CLOCK signal when receiver 100 is operating in test mode. When operating in test mode for the low band, divider 180 divides the 1 GHz test signal by 32 to generate a 31 MHz TEST MODE CLOCK signal. When operating in test mode for the high band, divider 180 divides the 2 GHz test signal by 64 to generate a 31 MHz TEST MODE CLOCK signal. Thus, when operating in this test mode, there is a precise ratiometric frequency locking between the test signal or test tone provided to mixers 106, 108, 116, 118 and the TEST MODE CLOCK signal supplied to frequency synthesizer 120, ADCs 144, 154 and DSP 146. In other words, there is a precise ratiometric frequency locking between the test signal injected into the I and Q channel mixers and the input clock rate of frequency synthesizer 120, ADCs 144, 154, and DSP 146. In test mode, frequency synthesizer 120, ADCs 144, 154, and DSP 146 are locked in frequency to ring oscillator 170. The ratio of the frequency of the test signal supplied to the mixer inputs to the frequency of the TEST MODE CLOCK signal supplied to frequency synthesizer 120, ADCs 144, 154, and DSP 146 in test mode, is known and fixed. It is noted that in one embodiment, the frequency of the TEST MODE CLOCK signal is not precisely the same as the MAIN CLOCK signal, but is within approximately 20% of the value of the MAIN CLOCK signal. It is generally desirable that the frequency of the TEST MODE CLOCK be selected such that the frequency of the test signal from which it is generated by divider 180 falls within the particular frequency band selected for operation, namely one of the low bands or one of the high bands, in this particular embodiment. It is also noted that, in one embodiment, in normal mode the ratio of the frequency of the receive signal supplied to the mixers to the frequency of the MAIN CLOCK signal supplied to frequency synthesizer 120, ADCs 144, 154 and DSP 146 is not fixed.

In another embodiment, the TEST MODE CLOCK signal is generated from a dedicated divider path that extends back to ring oscillator 170, rather than the TEST MODE CLOCK signal being generated via a connection of divider 180 to the inputs of IR source buffers 176 and 178. In such an embodiment, the divider path would be from ring oscillator 170 to a dedicated divider identical to divider 174 to a dedicated divider identical to divider 180 and then to the TEST MODE CLOCK input of MUX 160.

During low band test mode, DSP 146 conducts test to determine image correction information that will enable DSP 146 to suppress undesired image signals when receiver 100 switches from test mode to normal mode. In low band test mode with the 1 GHz test signal (IR SOURCE) injected into the mixers and the TEST MODE CLOCK signal supplied to synthesizer 120, ADC 144, ADC 154 and DSP 146, DSP 146 performs a low band test to determine image correction information. More particularly, DSP 146 determines I and Q gain and phase errors exhibited by the analog stages of the I and Q channels, namely the mixers used for low band operation and the low pass filter, PGA and ADC stages of the I and Q channels. In one embodiment, DSP 146 is programmed to implement a digital filter that adapts coefficients to correct for channel gain and phase errors as described by patent applications Ser. No. 10/675,601 and Ser. No. 10/673,905. These coefficients are stored as image correction information in a calibration result memory 182 coupled to DSP 146.

For high band operation, the 2 GHz test signal (IR SOURCE) is injected into the high band mixers and the TEST MODE CLOCK signal is supplied to synthesizer 120, ADC 144, ADC 154 and DSP 146. DSP 146 performs a test to determine image correction information for high band operation. DSP 146 tests to determine I and Q gain and phase errors exhibited by the mixers used for high band operation and the low pass filter, PGA and ADC stages of the I and Q channels. DSP 146 is programmed to implement a digital filter that adapts coefficients to correct for channel gain and phase errors for high band operation. These coefficients are stored as image correction information in calibration result memory 182.

Once the image correction information is determined and stored, communication receiver 100 may switch from test mode to normal mode. When receiver 100 switches to normal mode, controller 162 instructs MUX 160 to send the MAIN CLOCK signal instead of the TEST MODE CLOCK signal to synthesizer 120, ADC 144, ADC 154 and DSP 146. Controller 162 also turns LNAs 102, 104, 112 and 114 back on as needed for the particular band of operation desired. Controller 162 turns IR source buffers 176, 178 off during normal mode to remove the test signal from the input of the mixers.

In normal mode, DSP 146 applies the image correction information to a digital filter implemented in the DSP to suppress or substantially reduce image signals in the I and Q channels. DSP 146 includes I and Q outputs which are coupled via digital to analog converters (DACs) 190 and 192 to respective I and Q inputs of baseband circuitry 194, as shown.

It is noted that, in normal mode, the ratio of the frequency of the receive signal at the mixer inputs to the frequency of the clock signal provided to the frequency synthesizer, ADCs and DSP is not fixed. Rather, this ratio varies as the frequency of the receive signal changes when the receiver is tuned from frequency channel to frequency channel during normal operation. However, when receiver 100 switches to test mode, the ratio of the frequency of the test signal provided to the mixer inputs to the frequency of the TEST MODE CLOCK signal provided to the frequency synthesizer, ADCs and DSP is known and fixed. This fixed ratiometric relationship facilitates the error correction testing performed by DSP 146 when receiver 100 is in test mode.

It is also noted that, in one embodiment, components of receiver 100 to the left of baseband circuitry 194 and dashed line 196 in FIG. 1 may be fabricated together on a common integrated circuit. In that case, line 196 represents the edge of a substrate on which the circuitry to the left of line 196 is situated. It is further noted that frequency synthesizer 120, ADCs 144, 154 and DSP 146 are considered to be stages of receiver 100.

FIG. 2 is a flowchart depicting process flow as communication receiver 100 performs test operations in test mode and then subsequently performs image correction activities in normal operational mode. Receiver 100 is initialized as per block 200 and enters test mode, as per block 205. The test mode may also be referred to as an image reject acquisition mode. Upon entering test mode, receiver 100 configures itself for image rejection testing and calibration, as per block 210. For example, controller 162 instructs MUX 160 to supply the TEST MODE CLOCK signal to synthesizer 120, ADC 144, ADC 154 and DSP 146 instead of the MAIN CLOCK signal. Controller 162 instructs LNAs 102, 104, 112 and 114 to enter a disabled state. Controller 162 instructs IR SOURCE buffers 176 and 178 to enter an enabled state thus causing the test signal (IR SOURCE) derived from ring oscillator 170 to be injected as a test tone into the mixer inputs. DSP 146 then conducts a test to determine gain and phase errors in the I and Q channels, as per block 215. This test is performed on the low band I and Q stages to yield low band error correction information that is stored in calibration result memory 182. The test is again performed on the high band I and Q stages to yield high band error correction information that is stored in calibration memory 182.

When image error correction testing is complete, receiver 100 enters the normal mode of operation, as per block 220. Receiver 100 configures itself for the normal mode of operation, as per block 225. More particularly, controller 162 instructs MUX 160 to pass the MAIN CLOCK signal through to synthesizer 120, ADC 144, ADC 154 and DSP 146 instead of the TEST MODE CLOCK signal. Controller 162 also enables LNAs 102 104, 112, 114 and disables IR source buffers 176 and 178 when operating in normal mode. DSP 146 uses the stored error correction information to adjust compensating processes in the DSP to suppress image signals in the I and Q channels, as described in patent applications Ser. No. 10/675,601 and Ser. No. 10/673,905. Receiver 100 thus receives communication signals in normal mode with suppressed image frequency content, as per block 230.

While the receiver 100 is disclosed as operating on representative low band and high band frequencies, the teachings herein can be extended to allow the receiver to operate on other bands and frequencies while suppressing undesired image content.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of suppressing an image signal in a radio frequency receiver, the method comprising;

supplying, while in a test mode, a test signal to a mixer in the receiver and a first clock signal to receiver stages coupled to the mixer, one of the receiver stages being a digital signal processor, the first clock signal being a divided down version of the test signal;

determining, by the digital signal processor while in the test mode, image correction information relating to errors caused by the receiver stages;

switching, by the receiver, to a normal mode;

supplying, while in the normal mode, a second clock signal to the receiver stages and a receive signal to the mixer instead of the test signal, the receive signal being mixed by the mixer to provide a mixed receive signal, and correcting, by the digital signal processor while in the normal mode, the mixed receive signal with the image correction information to suppress image signals therein.

2. The method of claim 1, wherein the first clock signal supplied to the receiver stages is locked in frequency with respect to the test signal supplied to the mixer while the receiver is in the test mode.

3. The method of claim 1, further comprising supplying a local oscillator signal, by a frequency synthesizer included in the receiver stages, to the mixer to generate the mixed received signal.

4. The method of claim 1, further comprising sampling, by an analog to digital converter included in the receiver stages, the mixed received signal to provide a sampled mixed received signal to the digital signal processor.

5. The method of claim 1, wherein the mixer includes an in-phase mixer and a quadrature mixer.

6. The method of claim 5, wherein the receiver stages include an in-phase channel and a quadrature channel that together provide mixed received signals to the digital signal processor.

7. The method of claim 1, further comprising storing, by a memory in the receiver, the image correction information.

8. The method of claim 1, wherein the determining step includes determining, by the digital signal processor, image correction information relating to operating the receiver in a first radio frequency band.

9. The method of claim 8, wherein the determining step includes determining, by the digital signal processor, image correction information relating to operating the receiver in a second radio frequency band.

10. A radio frequency receiver comprising:
a radio frequency (RF) input;
a mixer, coupled to the RF input;
a plurality of receiver stages coupled to the mixer, one of the stages being a digital signal processor (DSP);
a test signal generator, coupled to the mixer, that supplies the mixer with a test signal exhibiting a predetermined frequency, when the receiver is in a test mode;
a divider, coupled to the test signal generator, that divides the test signal to provide a first clock signal exhibiting a first frequency to the receiver stages, when the receiver is in the test mode, the DSP determining image correction information relating to errors caused by the receiver stages while in the test mode; and
a main reference clock, coupled to the receiver stages, that supplies the receiver stages with a second clock signal exhibiting a second frequency when the receiver is in a normal mode, a receive signal being supplied to the mixer instead of the test signal when the receiver is in the normal mode thus generating a mixed receive signal, the DSP correcting the mixed receive signal with the image correction information to suppress image signals therein when the receiver is in the normal mode.

11. The radio frequency receiver of claim 10, wherein the first clock signal supplied to the receiver stages is locked in frequency with respect to the test signal supplied to the mixer while the receiver is in the test mode.

12. The radio frequency receiver of claim 10, wherein the receiver stages include a frequency synthesizer which is clocked with the first clock signal when the receiver is in the test mode, the frequency synthesizer supplying a local oscillator signal to the mixer.

13. The radio frequency receiver of claim 12, wherein the frequency synthesizer is clocked with the second clock signal when the receiver is in the normal mode.

14. The radio frequency receiver of claim 10, wherein the receiver stages include an analog to digital converter (ADC) coupled between the mixer and the DSP, the ADC sampling the mixed receive signal to provide a sampled mixed receive signal to the DSP.

15. The radio frequency receiver of claim 10, wherein the mixer includes an in-phase mixer and a quadrature mixer.

16. The radio frequency receiver of claim 10, wherein the receiver stages include an in-phase channel and a quadrature channel that together provide mixed received signals to the digital signal processor.

17. The radio frequency receiver of claim 10, further comprising a controller coupled to a multiplexer that operates in the test mode to supply the mixer with the test signal and the receiver stages with the first clock signal, the multiplexer further operating in the normal mode to supply the second clock signal to the receiver stages instead of the first clock signal.

18. The radio frequency receiver of claim 17, wherein the controller disables the test signal when the receiver is operating in the normal mode.

19. The radio frequency receiver of claim 10, further comprising a memory coupled to the DSP that stores the image correction information.

20. An integrated circuit comprising:
a substrate;
a radio frequency (RF) input;
a mixer, coupled to the RF input;
a plurality of receiver stages coupled to the mixer, one of the stages being a digital signal processor (DSP);
a test signal generator, coupled to the mixer, that supplies the mixer with a test signal exhibiting a predetermined frequency, when the receiver is in a test mode;
a divider, coupled to the test signal generator, that divides the test signal to provide a first clock signal exhibiting a first frequency to the receiver stages, when the receiver is in the test mode, the DSP determining image correction information relating to errors caused by the receiver stages while in the test mode; and
a main reference clock, coupled to the receiver stages, that supplies the receiver stages with a second clock signal exhibiting a second frequency when the receiver is in a normal mode, a receive signal being supplied to the mixer instead of the test signal when the receiver is in the normal mode thus generating a mixed receive signal, the DSP correcting the mixed receive signal with the image correction information to suppress image signals therein when the receiver is in the normal mode;
the RF input, the mixer, the plurality of receiver stages, the test signal generator, the divider and the main reference clock all being situated on the substrate.

21. The integrated circuit of claim 20, wherein the first clock signal supplied to the receiver stages is locked in frequency with respect to the test signal supplied to the mixer while the receiver is in the test mode.

22. The integrated circuit of claim 20, wherein the receiver stages include a frequency synthesizer which is clocked with the first clock signal when the receiver is in the test mode, the frequency synthesizer supplying a local oscillator signal to the mixer.

23. The integrated circuit of claim 22, wherein the frequency synthesizer is clocked with the second clock signal when the receiver is in the normal mode.

24. The integrated circuit of claim 20, wherein the mixer includes an in phase mixer and a quadrature mixer.

25. The integrated circuit of claim 20, wherein the receiver stages include an in-phase channel and a quadrature channel that together provide mixed received signals to the digital signal processor.

26. The integrated circuit of claim 20, further comprising a controller coupled to a multiplexer that operates in the test mode to supply the mixer with the test signal and the receiver stages with the first clock signal, the multiplexer further operating in the normal mode to supply the second clock signal to the receiver stages instead of the first clock signal.

27. The integrated circuit of claim 26, wherein the controller disables the test signal when the receiver is operating in the normal mode.

* * * * *